July 21, 1942.　　　　K. A. PRICE　　　　2,290,447
MOTION PICTURE PROJECTOR
Filed May 25, 1940　　　2 Sheets-Sheet 1
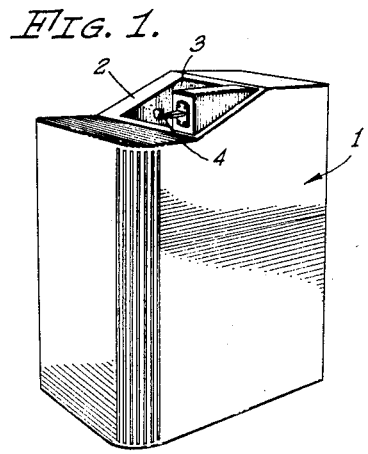
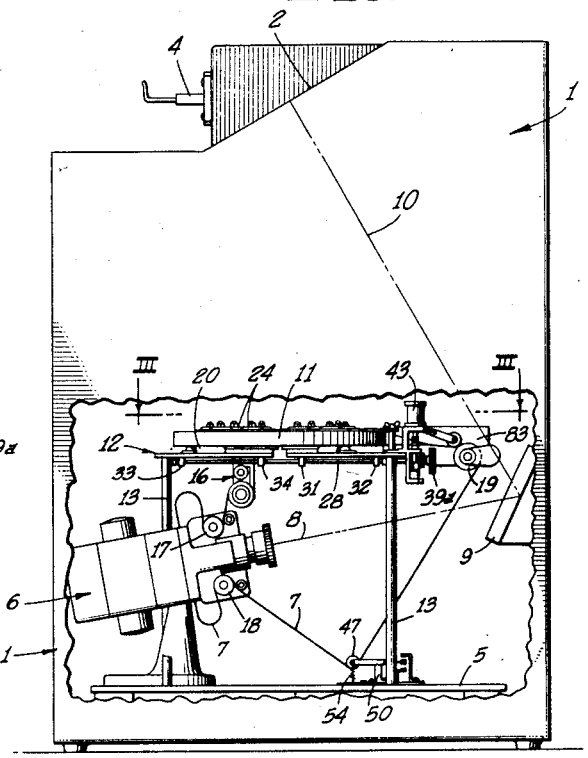
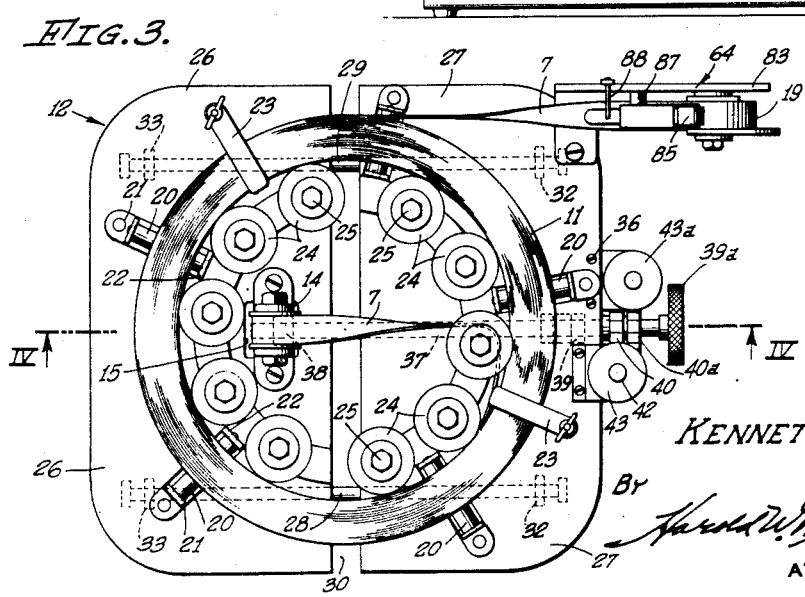
KENNETH A. PRICE
INVENTOR
By
ATTORNEY July 21, 1942.   K. A. PRICE   2,290,447

MOTION PICTURE PROJECTOR

Filed May 25, 1940   2 Sheets-Sheet 2

KENNETH A. PRICE
INVENTOR

By Harold W. Mattingly
ATTORNEY

Patented July 21, 1942

2,290,447

UNITED STATES PATENT OFFICE 2,290,447

MOTION PICTURE PROJECTOR

Kenneth A. Price, Los Angeles, Calif.

Application May 25, 1940, Serial No. 337,245

7 Claims. (Cl. 88—18.7)

My invention relates to motion picture projection apparatus and has particular reference to a coin actuated projection device adapted to repeatedly project a motion picture of predetermined length each time the apparatus is started as by the deposit of a coin into the device.

Projection apparatus of the above noted type is particularly adapted to installation in waiting rooms and similar public places wherein persons are to be found with nothing to occupy their immediate attention. In order to permit installation in such places the machine must be fully automatic in its operation so that upon insertion of a coin into a coin chute the machine will start the projection of the film and stop the projection after a predetermined length of film has been projected, leaving the equipment in a condition to be re-started for a repeating of the projection upon the insertion of the next coin.

In order for such automatic operation to be possible it is desirable that a number of different sequences of action be available and it is necessary that the film be of the endless type so that reverse rewinding of the film is not required. Ordinary sixteen mm. motion picture film requires that from thirty-five to fifty feet of film be projected each minute so that if, for example, a repertoire of five one minute sequences is desired, it is necessary to provide about two hundred feet of film arranged as an endless band. Accordingly some means must be provided for supporting such length of film in a compact and space saving manner while permitting it to be fed through the projector.

It is accordingly an object of my invention to provide a coin actuated motion picture projection apparatus which includes a means for supporting a coil of motion picture film in such fashion that film may be fed from one end of said coil through a motion picture projector and back to the other end of said coil.

It is also an object of my invention to provide an apparatus of the character set forth in the preceding paragraph wherein means is provided for maintaining the size of the coil substantially constant as the film is simultaneously fed on to and off of the coil.

It is an additional object of my invention to provide an apparatus of the character set forth in the preceding paragraphs with a means responsive to arrival of a predetermined point on the length of film at a predetermined location for stopping the operation of the projector.

It is a still further object of my invention to provide an apparatus of the character set forth in the preceding paragraphs in which the means for stopping the projector comprises a switch means responsive to the arrival at the location of the switch means of a notch provided in the edge of the film.

In view of the relatively great length of film employed in the device it is desired that some means be provided for preventing the film tension from exceeding a predetermined safe value in order to prevent breakage of the film, and it is also desirable to provide a means for rendering the apparatus inoperative in case the film should become broken.

It is accordingly a still further object of my invention to provide an apparatus of the character hereinbefore described which includes a means responsive to the tension of the film for controlling the diameter of the coil of stored film.

It is an additional object of my invention to provide an apparatus of the character set forth in the preceding paragraph in which the tension responsive mechanism is operable to reduce the diameter of the coil of stored film upon the tension in that portion of the film which extends to the projector exceeding a predetermined value.

It is also an object of my invention to provide an apparatus of the character set forth which includes a means responsive to the breaking of the film for placing the apparatus in an inoperative condition.

Other objects and advantages of my invention will be apparent from a study of the following specifications, read in connection with the accompanying drawings, wherein:

Fig. 1 is a perspective view of a coin actuated projection apparatus constructed in accordance with my invention;

Fig. 2 is a side view of the apparatus shown in Fig. 1 with a part of the cabinet broken away to show the mechanisms enclosed thereby;

Fig. 3 is a plan view of the film storage mechanism taken substantially along the line III—III of Fig. 2;

Fig. 4 is a vertical sectional view taken substantially along the line IV—IV of Fig. 3 to illustrate the manner in which the diameter of the storage coil may be adjusted;

Figure 5:
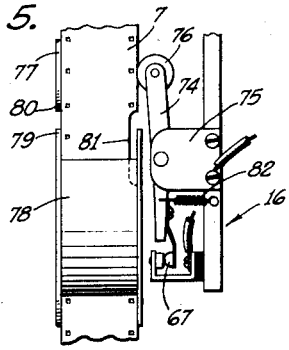
Fig. 5 is a fragmentary elevational view illustrating one form of control switch which may be employed for stopping the operation of the device after a predetermined length of film has been projected.

Referring to the drawings, I have illustrated in Fig. 1 the preferred embodiment of my invention as including a cabinet 1 within which is mounted the projecting equipment to be described hereinafter. The cabinet 1 may be provided with a sloping top 2 fitted with a translucent projecting screen 3 upon which the image of the picture projected by the projection apparatus may be observed. The cabinet 1 preferably also carries a coin collecting mechanism or chute 4 permitting the insertion of a coin into the device for the purpose of starting the device in operation.

As is shown in Fig. 2 the mechanism may be supported within the housing 1 as by means of a supporting table 5 upon which is mounted a motion picture projector 6 of conventional construction adapted to receive a motion picture film 7 and project images of the pictures carried by the film 7 along a projection line 8. A suitable reflector such as a mirror 9 is mounted upon one end of the cabinet 1 in such position as to redirect the projection line 8 along a line such as that indicated by reference character 10 in Fig. 2 so as to strike the translucent screen 3 at substantially right angles thereto. The projector 6 is, of course, so focused and adjusted as to substantially fill the translucent screen 3 with an in-focus image of the pictures carried by the motion picture film 7.

As is indicated in Figs. 2 and 3, the motion picture film 7 is of the endless band type having a considerable length, the bulk of which is stored in coil form as indicated in Fig. 3 by the coil 11. This coil is preferably supported upon a table 12 which is mounted a convenient distance above the base plate 5 and projector 6 as by means of a plurality of legs 13.

The film 7 is preferably fed from the inside of the coil 11 and over a roller or idler 14 and downwardly through a slot 15 provided in the table 12 so as to permit the film 7 to be passed over a pair of rollers comprising a part of a tripping mechanism 16 and from thence to the feeding sprocket 17 of the projector 6. As the film is fed from the projector 6 by means of a take-up sprocket 18, it is passed upwardly beneath the table 12 and over a roller 19 and from thence generally horizontally to the outside of the coil 11. It will be observed that as the projector is operated to project motion pictures upon the screen 3, film will be withdrawn from the inside of the coil 11, thus causing the coil 11 to rotate and will be returned to the outside of the coil as this rotation takes place.

The coil 11 may be conveniently mounted for rotation upon the table 12 by providing a plurality of horizontally disposed rollers 20, each of which may be journaled for rotation about a horizontal axis by means of suitable bearing brackets 21 and 22. The axes of the rollers 20 are preferably substantially radially disposed relative to the coil 11 so that the coil may be rotated in a horizontal plane about its own axis.

Upward creepage of one turn of film on the coil 11 relative to the other turns thereof may be prevented by providing one or more pressure plates or guide members 23 which may comprise merely flat strips of metal disposed in a position closely adjacent the upper surface of the coil 11 so as to engage and prevent upward movement of any turns of the coil 11 which rise above a certain predetermined height. Similarly, the size and shape of the coil 11 may be maintained by providing a plurality of rollers 24, each of which is mounted for rotation about its own vertically disposed axis 25, the axis 25 of the plurality of rollers 24 being arranged in circular form so that the outer faces of the rollers 24 which are engaged by the coil 11 define a circular shape for this coil.

It will be observed that since the film is fed from the coil from the inside thereof and wound upon the coil from the outside thereof, the coil will tend to increase in diameter. This tendency to increase in diameter prevents the film from moving inwards and binding against the rollers 24 and the resulting relief of pressure on these rollers permits the coil 11 to very readily rotate upon the above described rotary mounting. The tendency of the coil to increase in size is arrested by the fact that the pull which is exerted on that portion of the film 7 which is unwound from the inside of the coil tends to pull the inner turns inwardly and to rotate these turns more rapidly than the outer turns so as to cause each turn to slide slightly past the adjacent turns and tend to reduce the diameter of the coil 11. Under ordinary circumstances these two tendencies balance each other so that the coil 11 maintains a fixed size all during the time film is being fed from the inside thereof and on to the outside thereof.

It occasionally happens, however, that the pull on the film being removed from the inside of the coil will tend to wrap the inner few turns tightly about the plurality of rollers 24 so as to cause a bind tending to prevent rotation of the coil 11. In order to prevent the operation of the projector 6 from breaking the film as a result of this binding, I prefer to provide a means whereby the tension on the film may be relieved. This may be accomplished by forming the table 12 of two halves 26 and 27 which are mounted for movement relative to each other. Such a mounting may comprise a structure such as that illustrated in Figs. 2 and 3 as comprising a pair of guide rods 28 and 29 extended transversely of a space 30 which separates the halves 26 and 27 from each other. The guide rods 28 and 29 are preferably secured to one of the halves, such as the half 27, as by extending them through bores provided in downwardly depending ears 31 and 32 provided on the underside of the half 27 and by locking the guide rods 28 and 29 in these ears as by means of set screws (not shown). The other table half is likewise provided with downwardly depending ears 33 and 34 which are bored to slidably receive the guide rods 28 and 29 so as to permit the table half 26 to be slid along the rods 28 and 29 to widen or narrow the gap 30.

Movement of the table half 26 relative to the half 27 may be permitted by extending a supporting bar 35 between the rear uprights or supports 13 and by merely resting the rearwardmost end of the half 26 upon this supporting bar so that it may be slid relative thereto. The other table half 27 is preferably securely attached to the forward supports 13 as by means of machine screws 36. It will thus be seen that movement of the table half 26 in such direction as to narrow the gap 30 will result in relieving the bind of the coil 11 upon the rollers 24 and at the same time relieve the tension in the film so as to prevent breakage thereof.

The position of the table half 26 relative to the table half 27 may be controlled and adjusted by means of a feed screw 37 which is threadedly engaged with a downwardly depending lug 38 formed on the table half 26 and journaled for rotation in a similar lug 39 carried by the table half 27. The forwardmost end of the feed screw 37 is preferably provided with a hand wheel 39a which may be manually rotated to move the table halves toward each other.

Figure 8:
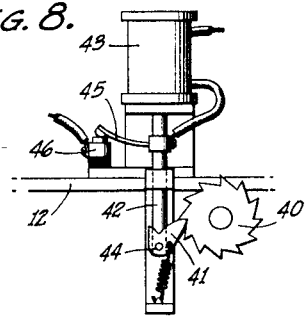
Fig. 8 is a fragmentary elevational view illustrating one form of power mechanism which may be employed in connection with the tension responsive device illustrated in Fig. 7 for controlling the tension of the film.

If desired, rotation of the feed screw 37 in a direction to move the table halves toward each other may be effected automatically by means of a mechanism which may be conveniently constructed along the lines illustrated in Fig. 8 wherein a ratchet wheel 40 is illustrated as being secured to the feed screw 37 and engaged with a pawl 41 mounted upon a vertically extending arm 42 of a solenoid 43. Energization of the solenoid 43 will move the arm 42 upwardly so as to engage the pawl 41 with one of the notches of the ratchet wheel 40 and impart a partial rotation to the feed screw 37. Deenergization of the solenoid 43 will allow the arm 42 to return to its initial or lowermost position, downward movement of the pawl 41 past the teeth of the ratchet 40 being permitted as by pivotally mounting the pawl 41 upon the lower end of the arm 42 as indicated in Fig. 8 at 44.

Automatic deenergization of the solenoid 43 at the time the arm 42 is pulled to its uppermost position may be obtained by securing a contact member 45 to the arm 42 to permit its being moved therewith and by providing a stationary contact member 46 in a position to be engaged by the contact member 45. The contact members 45 and 46 may be connected in series with the solenoid 43 so as to automatically deenergize the solenoid when the arm 42 is pulled to its uppermost position so as to allow the arm 42 to return to its lowermost position and be again raised by the resultant re-energization of the solenoid 43 resulting from the closing of the contacts 45 and 46. A similar mechanism comprising a solenoid 43a adapted to engage a pawl 41a with a ratchet wheel 40a (the teeth of which are inclined oppositely to the teeth of the ratchet wheel 40) mounted on the feed screw 37 may be employed to rotate the screw 37 in the opposite direction.

The amount of relative movement of the table halves 26 and 27 which is afforded by the above described mechanism is preferably made sufficient to take up or let out a length of film at least as great as one turn of the coil 11. By so doing I am permitted to cut the film 7 and remove portions thereof and to splice in additional film, if desired, without requiring that the portion removed or inserted have a length comprising a multiple of the length of one turn of the coil 11. Any desired length of film may be removed or inserted into the endless loop and then the spacing between the table halves 26 and 27 may be adjusted either manually by means of the knob 39a or automatically by means of the solenoids 43 or 43a to include within the coil 11 the proper amount of storage film to provide the required operating conditions as regards that portion of the film which extends between the inside of the loop and the projector and between the projector and the outside of the loop.

Figure 7:
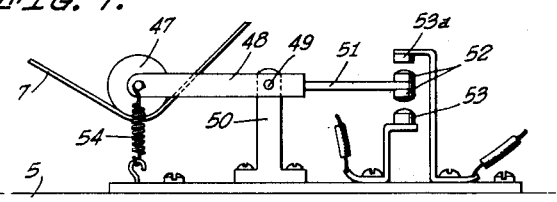
Fig. 7 is a fragmentary elevational view illustrating one form of tension responsive means which may be employed for controlling the film tension.

The above described mechanism for moving the table halves 26 and 27 toward and away from each other may be arranged to automatically operate by placing the mechanism under the control of a tension responsive means which operates to actuate the mechanism whenever the film tension varies materially from a predetermined value. Such a tension responsive means may comprise a switch constructed along the lines illustrated in Fig. 7 wherein that portion of the film 7 which extends from the projector 6 and over the idler 19 is illustrated as having a roller 47 engaged with the upper side thereof. The roller 47 is preferably journaled for rotation upon an arm 48 which is in turn mounted for pivotal movement about a pivot pin 49 carried on a supporting member 50. A rearwardly extending portion 51 of the arm 48 may carry an electrical contact 52 adapted to be brought into engagement with a stationary electrical contact 53 upon elevation of the roller 47 to a predetermined height and into engagement with another fixed contact 53a upon lowering of the roller 47 to another predetermined location. The roller 47 is preferably urged downwardly as by means of a spring 54 so that its vertical position will be determined by the tension in the film 7. The strength of the spring 54 and the spacing between the contacts 52, 53 and 53a is preferably so adjusted as to cause one or the other of these pairs of contacts to be engaged at the time the tension of the film 7 varies unduly from a predetermined value.

Figure 9:
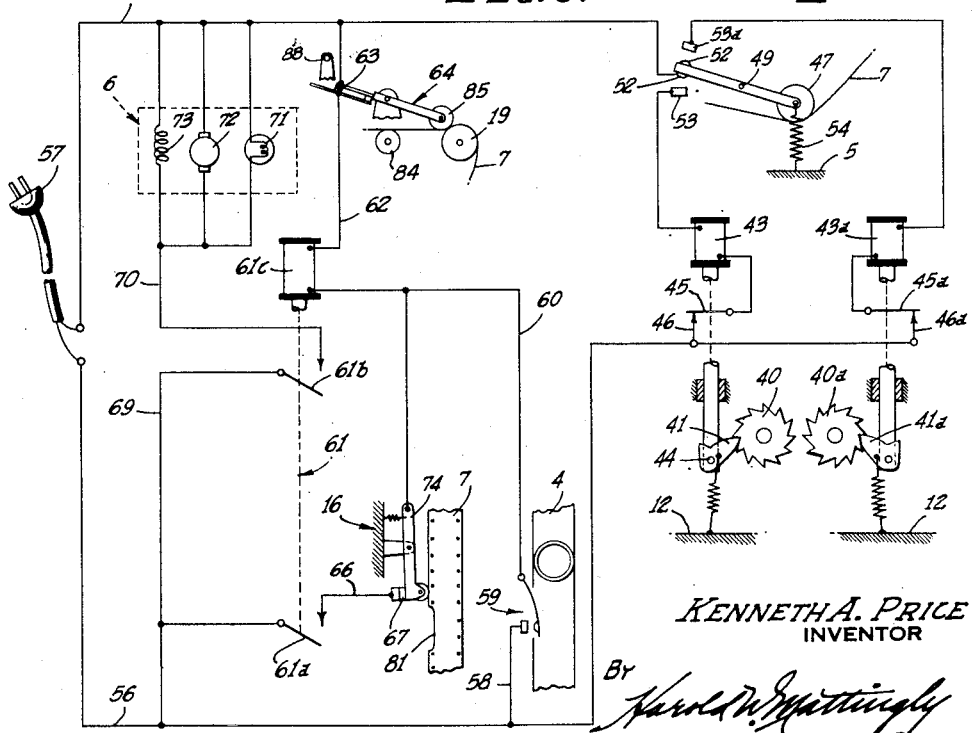
Fig. 9 is a schematic view illustrating the electrical connections employed in one form of apparatus constructed in accordance with my invention.

The manner in which closing of the contacts 52 and 53 may be employed for moving the table halves 26 and 27 toward each other may be seen by having reference to Fig. 9 wherein a pair of line conductors 55 and 56 are illustrated as being adapted to connection to a suitable source of electric power as by means of a conventional cord cap or plug member 57 and in which the switch contacts 52—53, the solenoid 43, and the switch contacts 45 and 46 are illustrated as being all connected in series between the conductors 55 and 56. It will be observed that closing of the contacts 52 and 53 thus serves to energize the solenoid 43 from the supply conductors 55 and 56 so as to cause the ratchet wheel 40 and the feed screw 37 secured thereto to be notched around until the tension in the film 7 is reduced sufficiently to permit opening of the contacts 52 and 53 at which time the solenoid 43 is deenergized and further movement of the table halves 26 and 27 toward each other is arrested. The switch contacts 52 and 53a are likewise connected in series with the solenoid 43a and switch contacts 45a—46a across the line conductors 55 and 56 so that in the event the tension in the film 7 should become too little, the solenoid 43a would be energized to move the table halves 26 and 27 away from each other and re-establish the desired tension.

The manner in which the projection equipment is actuated in response to the insertion of a coin in the coin chute 4 may also be readily observed by having reference to Fig. 9. As is illustrated therein the line conductor 56 is connected by means of a conductor 58 to a coin switch 59 which is so disposed in operative relation with the coin chute 4 as to cause momentary closing of the contacts upon the insertion of a coin into the coin chute. The other terminal of the coin switch 59 may be connected as by means of a conductor 60 to a control relay 61, the other terminal of which is connected by means of a conductor 62 through normally closed contacts 63 of a lock-out device 64 to the other line conductor 55.

The description and operation of the lockout device 64 will be described in detail hereinafter and for the present description it will be assumed that the contacts 63 are maintained in their closed position so that insertion of a coin into the coin chute 4 will momentarily close the coin switch 59 to complete the above described circuit and energize the coil 61c of the relay 61. Energization of the relay coil 61c immediately closes contacts 61a thereof which are connected in series between the line conductor 56 and a conductor 66. The conductor 66 is extended through normally closed contacts 67 of the tripping device 16 and into connection with the aforementioned conductor 60. Closing of the contacts 61a therefore completes a circuit 61a—66—67 extended in parallel with the coin switch 59 so that the relay coil 61c is maintained energized after the coin switch 59 opens.

Simultaneously with the closing of the relay contact 61a, relay contacts 61b are also closed so as to supply power from the line conductor 56 through conductors 69 and 70 to the electrical mechanism included in the projector 6. This mechanism is illustrated as comprising a light source 71 and a driving motor having an armature 72 and a shunt field 73. These three elements are connected in parallel between the conductor 70 and the other line conductor 55 so that upon energization of the relay coil 61c the projector is placed in operation and is maintained in operation until such time as the relay coil 61c is denergized to permit the contacts 61b to reopen.

The deenergization of the relay coil 61c is preferably accomplished after a predetermined length of film has been projected by means of the aforementioned tripping device 16. This device is illustrated in Fig. 5 as comprising an arm 74 pivotally mounted upon a bracket 75 in such position that a roller 76 mounted upon the end of the arm 74 will bear against one edge of the film 7. The film 7 is preferably held against lateral movement relative to the rollers 76 as by passing it over a pair of rollers 77 and 78 which are provided with flanges 79 and 80 adapted to engage the edge of the film 7 opposite to that engaged by the roller 76. The other end of the arm 74 preferably carries one of the normally closed contacts 67, the other contact thereof being mounted in a fixed position upon a supporting plate 80 to which the bracket 75 is attached. The film 7 is preferably notched as indicated at 81 at predetermined spaced points along its length so that each of the notches 81 will be engaged by the roller 76 at the times it is desired to stop the operation of the projector 6. The depth of the notch 81 is so adjusted that when the roller 76 is urged thereinto by means of a spring 82 the contacts 67 will be opened.

Reference to Fig. 9 will disclose that the opening of the contact 67 will interrupt the circuit 61a—66—67 so as to deenergize the relay 61c and effect the stopping of the operation of the projector in the manner above described. The notches 81 are preferably made of such length that after the projector is deenergized the coasting of the projector mechanism will be sufficient to again re-close the contacts 67 so that a subsequent deposit of a coin in the coin chute 4 will be effective in again causing the projector to operate until such time as the roller 76 engages the next notch along the length of the film 7. It will thus be seen that the device is responsive to deposit of a coin in the coin chute 4 for initiating the projection operation and is also responsive to the notches 81 distributed along the length of the film 7 for stopping the projection operation.

Figure 6:
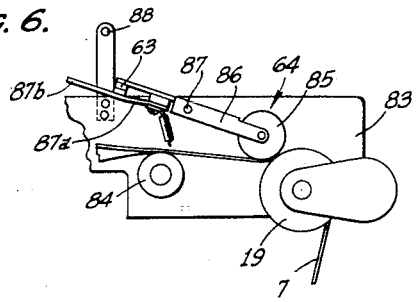
Fig. 6 illustrates a switch of my invention which may be employed for placing the apparatus in an inoperative condition upon breakage of the film.

It is desirable that some means be provided for rendering the projector inoperative should the film 7 become broken in order to prevent unwinding of all of the film from the coil 11. This function is served by the lock-out device 64 which is preferably constructed along the lines illustrated in Figs. 6 and 2 wherein the aforementioned roller 19 is illustrated as being mounted upon a bracket 83 carried by the table half 27. The bracket 83 also carries an auxiliary roller 84 over which the film 7 is passed. A third roller 85 is preferably mounted upon an arm 86 which is in turn pivotally supported as by means of a pivot 87 upon the bracket 83 so as to permit movement of the roller 85 toward and away from the film 7. A rigid portion of the arm 86 carries one contact member of the aforementioned contacts 63, the other contact member being supported in normal engagement therewith by means of a spring 87a. The spring 87a includes an outwardly extending portion 87b adapted to be brought into engagement with a pin 88 upon substantial clockwise movement of the arm 86.

The above described parts are preferably so adjusted that the portion 87b will be spaced from the pin 88 and the contact 63 will be closed as long as the roller 85 is held up by a piece of the film 7 extending between the rollers 19 and 84. Should the film break, the roller 85 is allowed to move downwardly as soon as the end of the broken film is moved past the roller 19, the downward movement of the roller 85 operating to bring the portion 87b into engagement with the pin 88 and open the normally closed contacts 63 which are connected in series with a coil 61c. It will be observed that the breaking of the film thus results in the deenergization of the coil 61c so as to stop operation of the device, and that operation of the device cannot be resumed until such time as the film is repaired so as to again raise the roller 85 and permit the contacts 63 to close.

From the foregoing it will be observed that I have provided a motion picture projection apparatus of the coin actuated type which includes a means for conveniently storing a major portion of a long endless band of motion picture film.

Attention is called to the fact that the method of supporting the coil of film which I have disclosed herein permits the housing of the projector and its associated control apparatus in a relatively small cabinet and that the protective devices which operate in conjunction with this means which support the film are so constituted as to reduce the breakage of the film to a minimum and to stop operation of the projector should the film be broken.

Attention is also called to the fact that the apparatus above described permits the size of the storage loop 11 to be adjusted to conform with the tension requirements of that portion of the film which is passed through the projector and that by properly adjusting the spacing between the table halves 26 and 27 the size of the loop 11 may be so altered as to provide the proper operating tension as regards that portion of the film extended exteriorly of the loop.

It will also be observed that this same adjustment may be employed for the purpose of regulating the amount of film which is extended exteriorly of the coil 11 after a portion of the film has been removed from the endless loop or after an additional length of film has been inserted therein, and that by this means the necessity of making such inserted or removed portion of a length equal to a multiple of the length of one turn of the coil 11 is obviated.

It will be further observed that the device of my invention includes a means which is responsive to the insertion of a coin for starting the projection operation, which operation is caused to continue until a predetermined length of motion picture film has been projected, at which time the operation of the device is stopped and the mechanism rendered responsive to the insertion of another coin for resuming the projection operation.

While I have shown and described the preferred embodiment of my invention, I do not desire to be limited to any of the details of construction shown or described herein, except as defined in the appended claims.

I claim:

1. In a motion picture projection apparatus including a film feeding means, the combination of: a horizontally disposed supporting table comprising a pair of table halves; means mounting said halves for movement toward and away from each other; a set of rollers disposed on said table in a circular spaced relation to each other, a part only of said rollers being disposed on one of said halves; means mounting each of said rollers for rotation about a horizontal axis disposed radially with respect to said circular spaced relation of said rollers; another set of rollers also disposed on said table in said circular spaced relation to each other; means mounting each of the rollers of said other set for rotation about a vertical axis; an endless motion picture film wound in a horizontally disposed coil encircling said other set of rollers and resting on said first set of rollers, the inner and outer ends of said coil being interconnected by a film loop which is engaged with said film feeding means in such manner that film is drawn from said inner end and returned to said outer end; and means for moving said halves toward and away from each other to adjust the tension in said film loop.

2. In a motion picture projection apparatus including a film feeding means, the combination of: a horizontally disposed supporting table comprising a pair of table halves; means mounting said halves for movement toward and away from each other; a set of rollers disposed on said table in a circular spaced relation to each other, a part only of said rollers being disposed on one of said halves; means mounting each of said rollers for rotation about a horizontal axis disposed radially with respect to said circular spaced relation of said rollers; another set of rollers also disposed on said table in said circular spaced relation to each other; means mounting each of said rollers of said other set for rotation about a vertical axis; an endless motion picture film wound in a horizontally disposed coil encircling said other set of rollers and resting on said first set of rollers, the inner and outer ends of said coil being interconnected by a film loop which is engaged with said film feeding means in such manner that film is drawn from said inner end and returned to said outer end; a mechanism actuatable to move said halves toward and away from each other; and control means engaged with said film loop responsive to change in film tension from a predetermined value for actuating said mechanism in such direction as to restore said tension to said predetermined value.

3. In a motion picture projection apparatus including a film feeding means, the combination of: an endless motion picture film wound in a coil, the inner and outer ends of which are connected by a film loop, said loop being engaged with said film feeding means in such manner that film is drawn from one end of said ends and returned to the other of said ends; a device engaged with said coil and actuatable to change the length of said loop; and means engaged with said film loop responsive to change in tension of said film from a predetermined value for actuating said device.

4. In a motion picture projection apparatus including a film feeding means, the combination of: an endless motion picture film wound in a coil, the inner and outer ends of which are connected by a film loop, said loop being engaged with said film feeding means in such manner that film is drawn from one of said ends and returned to the other of said ends; an electrical device engaged with said coil and actuatable when energized to change the length of said loop; an electric circuit for energizing said device; switch means in said circuit actuatable to energize said device; and means engaged with said film loop responsive to change in tension of said film from a predetermined value for actuating said switch means.

5. In a motion picture projection apparatus including a film feeding means, the combination of: an endless motion picture film wound in a coil, the inner and outer ends of which are connected by a film loop, said loop being engaged with said film feeding means in such manner that film is drawn from one of said ends and returned to the other of said ends; a device engaged with said coil including a means actuatable to increase the length of said loop and a mechanism actuatable to decrease the length of said loop; and means engaged with said loop and responsive to change in tension therein for actuating said means upon increase in tension and for actuating said mechanism upon decrease in tension.

6. In a motion picture projection apparatus including a film feeding means, the combination of: an endless motion picture film wound in a coil, the inner and outer ends of said coil being connected by a film loop engaged with said film feeding means in such manner that film is drawn from one of said ends and returned to the outer of said ends; means supporting said coil for rotation; means engageable with said coil and movable to vary the diameter thereof and adjust the tension in said film loop; and control means engaged with said film loop responsive to change in film tension from a predetermined value for moving said means in such manner as to restore said tension to said predetermined value.

7. In a motion picture projection apparatus including a film feeding means, the combination of: an endless motion picture film wound in a coil, the inner and outer ends of said coil being connected by a film loop engaged with said film feeding means in such manner that film is drawn from said inner end and returned to said outer end; means supporting said coil for rotation comprising a pair of members mounted for movement toward and away from each other and engaging the inside of said coil; means for moving said members to vary the diameter of said coil to thereby adjust the tension in said film loop; and control means engaged with said film loop responsive to change in film tension from a predetermined value for moving said members in such direction as to restore said tension to said predetermined value.

KENNETH A. PRICE.